(12) United States Patent
Flacks et al.

(10) Patent No.: US 6,604,191 B1
(45) Date of Patent: Aug. 5, 2003

(54) METHOD AND APPARATUS FOR ACCELERATING INSTRUCTION FETCHING FOR A PROCESSOR

(75) Inventors: Brian King Flacks, Georgetown, TX (US); David Meltzer, Wappingers Falls, NY (US); Joel Abraham Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/498,932

(22) Filed: Feb. 4, 2000

(51) Int. Cl.$^7$ ............................................. G06F 12/00
(52) U.S. Cl. ..................................... 712/207; 712/235
(58) Field of Search ................................ 712/207, 237, 712/235

(56) References Cited

U.S. PATENT DOCUMENTS

| | | | | |
|---|---|---|---|---|
| 5,696,958 A | * | 12/1997 | Mowry et al. ................. | 712/23 |
| 5,850,542 A | * | 12/1998 | Schroter et al. ............. | 712/235 |
| 5,918,044 A | * | 6/1999 | Levitan et al. ............... | 711/125 |
| 5,961,632 A | * | 10/1999 | Shiell et al. .................. | 712/11 |
| 5,961,637 A | * | 10/1999 | Sturges et al. ............... | 712/207 |
| 6,035,392 A | * | 3/2000 | Liptay et al. ................ | 712/233 |
| 6,334,184 B1 | * | 12/2001 | Dhong et al. ................ | 711/213 |

* cited by examiner

*Primary Examiner*—Eric Coleman
(74) *Attorney, Agent, or Firm*—Casimer K. Salys; Bracewell & Patterson, L.L.P.

(57) ABSTRACT

An instruction fetching system (and/or architecture) which may be utilized by a high-frequency short-pipeline microprocessor, for efficient fetching of both in-line and target instructions. The system contains an instruction fetching unit (IFU), having a control logic and associated components for controlling a specially designed instruction cache (I-cache). The I-cache is a sum-address cache, i.e., it receives two address inputs, which compiled by a decoder to provide the address of the line of instructions desired fetch. The I-cache is designed with an array of cache lines that can contain 32 instructions, and three buffers that each have a capacity of 32 instructions. The three buffers include a Predicted (PRED) buffer that holds the instructions which are currently being executed, a NEXT buffer that holds the instructions which are to be executed after the instructions in the PRED buffer, and an ALT buffer that holds the alternate set of instructions when a branch is predicted taken/not taken and is utilized along with the PRED buffer to permit branch target retrieval within I-cache prior to a prediction.

25 Claims, 3 Drawing Sheets

METHOD AND APPARATUS FOR ACCELERATING INSTRUCTION FETCHING FOR A PROCESSOR

BACKGROUND OF THE INVENTION

1. Technical Field

The present invention relates in general to data processing systems and in particular to a mechanism for fetching instructions within a data processing system. Still more particularly, the present invention relates to a method and apparatus for accelerating instruction fetching for a microprocessor in which both in-line and target instructions are provided in an efficient manner.

2. Description of the Related Art

A conventional processor may include an instruction fetch unit (IFU) for requesting instructions to be loaded, an instruction cache for storing instructions, an instruction buffer for temporarily storing instructions fetched from the instruction cache for execution, a number of execution units for executing sequential instructions, a branch processing unit (BPU) for executing branch instructions, a dispatch unit for dispatching sequential instructions from the instruction buffer to particular execution units, and a completion buffer for temporarily storing instructions that have finished execution, but have not been completed.

Conventional methods of fetching instructions using the above processor components are known in the art. Typically, these methods often result in cycle delays due to incorrectly fetched in-line instructions or incorrect predictions during branch processing. For example, during branch processing, if the branch that was predicted as taken is resolved as mis-predicted, a mis-predict penalty of several cycles is incurred by the processor due to the cycle time required to restore the sequential execution stream following the branch instructions (i.e., the processor has to abandon any result that the speculative instruction produced and begin executing the path that should have been taken). Another example occurs during in-line fetching, when an instruction is emulated (e.g., when a different set of code is utilized to perform the same function as the instruction) and/or an instruction fetch is temporarily halted. The IFU has to generate a return stack which takes a relatively long time to store values and read values prior to and after emulation.

Conventional instruction caches are typically large static blocks of temporarily stored instructions. The cache typically has very little functional logic and is designed solely to issue instructions out of a cache line once a corresponding line address is provided. The cache plays no part in the actual selection of instructions, branch processing, fetching branch targets, etc.

The present invention recognizes that it would be desirable and beneficial to have a system or processor architecture for effectively handling the fetching of instructions for a high-frequency, short pipeline processor. A system which also supported branch/target fetching without leading to process stalls or loss of cycles when target direction is incorrectly predicted would be a welcomed improvement. It would be further be desirable to have such a system which also permitted for fast restart of a process after instruction emulation. These and other benefits are presented in the invention described herein.

SUMMARY OF THE INVENTION

An instruction fetching system (and/or architecture) is disclosed, which may be utilized by a high-frequency short-pipeline microprocessor, for efficient fetching of both in-line and target instructions. The system contains an instruction fetching unit (IFU), having a control logic and associated components for controlling a specially designed instruction cache (I-cache). The I-cache is a sum-address cache, i.e., it receives two address inputs, which compiled by a decoder to provide the address of the line of instructions desired fetch. The I-cache is designed with an array of cache lines that can contain 32 instructions, and three buffers that each have a capacity of 32 instructions. The three buffers include a Predicted (PRED) buffer that holds the instructions which are currently being executed, a NEXT buffer that holds the instructions which are to be executed after the instructions in the PRED buffer, and an ALT buffer that holds the alternate set of instructions when a branch is predicted taken/not taken and is utilized along with the PRED buffer to permit branch target retrieval within I-cache prior to a prediction.

When a branch is encountered, instruction lines of both paths (taken/not taken) are sent to the instruction buffers and no stall occurs on the pipeline if the prediction is correct.

Address registers hold the line addresses of the instructions in each of the PRED. NEXT and ALT buffers and a 5-bit address corresponding to the specific instruction within the line to be sent to the instruction buffers. Up to four instructions are selected at a time from the instruction line in the PRED, ALT or NEXT buffer and sent to the instruction buffers. These instructions are typically selected sequentially (in-line). Use of the IFU and the I-cache provides a continuous supply of instructions to the processor pipeline without interruptions. Also, the invention supports efficient restart after a bad instruction is encountered or an instruction is emulated The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a block diagram of the 64-bit PREDA instruction address according to a preferred embodiment of the invention.

DETAILED DESCRIPTION OF ILLUSTRATIVE EMBODIMENT

Figure 1:
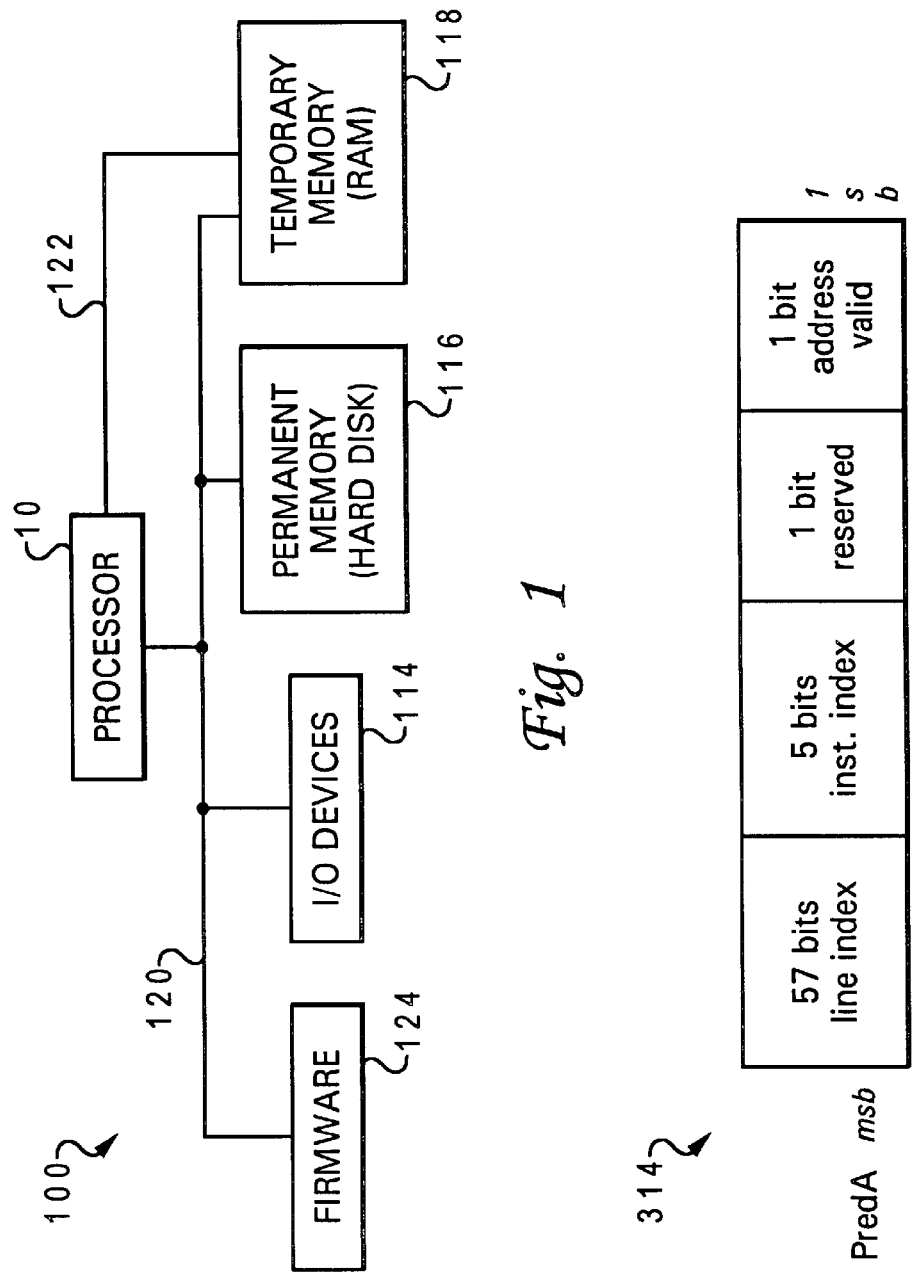
FIG. 1 is a block diagram of a data processing system utilized in one embodiment of the present invention.

With reference now to the figures and in particular with reference to FIG. 1, there is illustrated a block diagram of the basic structure of a data processing system 100 utilized in an embodiment of the invention. Data processing system 100 has at least one processor 10 which is connected to several peripheral devices, including input/output devices 114 (such as a display monitor, keyboard, and graphical pointing device) for user interface, a permanent memory device 116 (such as a hard disk) for storing the data processing system's operating system and applications, and a temporary memory device 118 (such as random access memory or RAM) that is utilized by processor 10 in execution of current program instructions. Processor 10 communicates with the peripheral devices by various means, including a bus 120 or a direct channel 122 (more than one bus may be provided utilizing a bus bridge).

Those skilled in the art will further appreciate that there are other components that might be utilized in conjunction with those shown in the block diagram of FIG. 1; for example, a display adapter connected to processor 10 might be utilized to control a video display monitor, and a memory controller may be utilized as an interface between temporary memory device 118 and processor 10. Data processing system 100 also includes firmware 124 whose primary purpose is to seek out and load an operating system from one of the peripherals (usually permanent memory device 116) whenever data processing system 100 is powered. In the preferred embodiment, processor 10 of data processing system 100 is a high-frequency short-pipelined processor.

Figure 2:
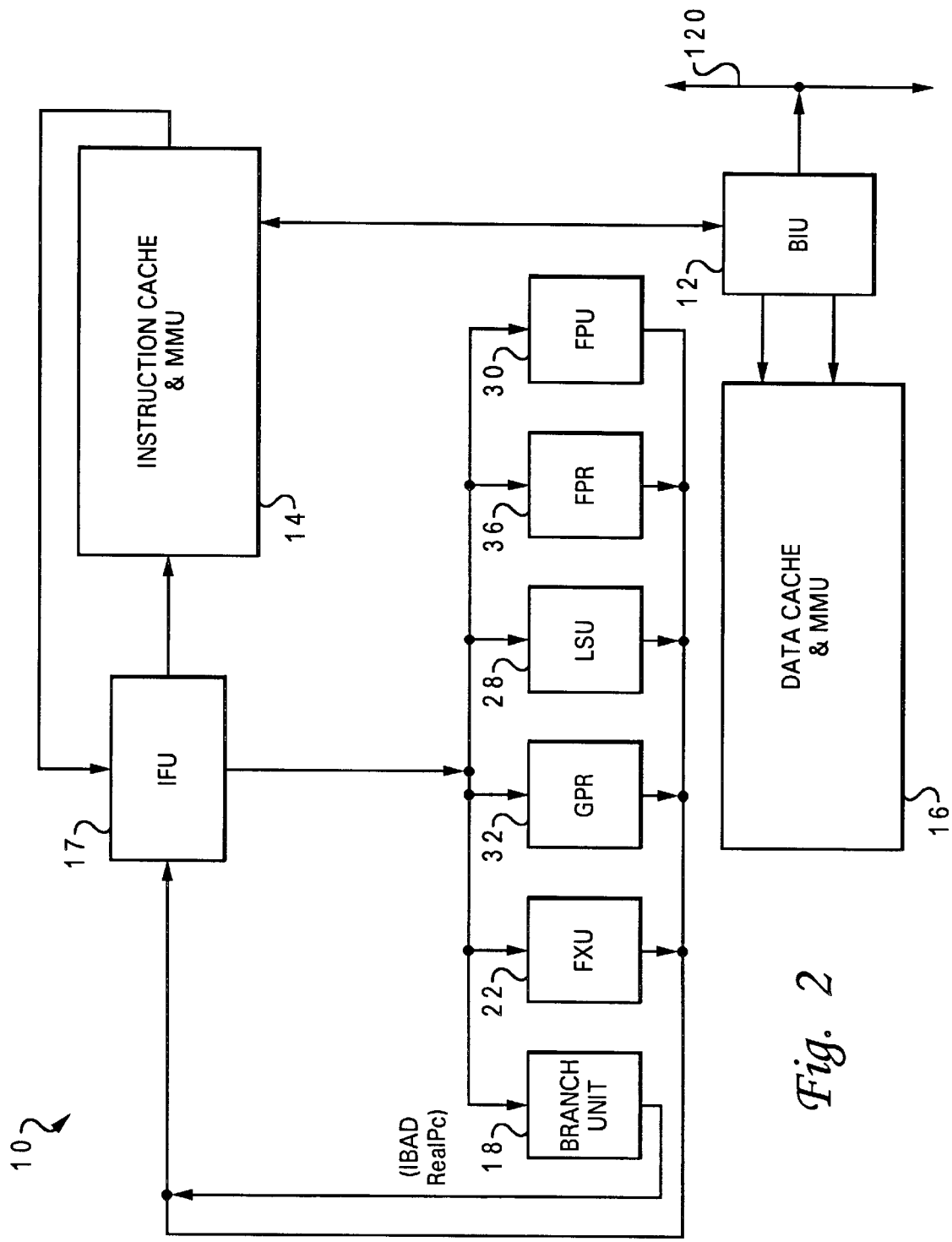
FIG. 2 is a block diagram of a processor utilized in a preferred embodiment of the present invention.

FIG. 2 is a high level block diagram of an embodiment of processor 10, according to a preferred embodiment of the present invention. Processor 10 may be located within data processing system 100 as depicted in FIG. 1. In the preferred embodiment, processor 10 is a single integrated circuit, high-frequency, short-pipelined processor. Accordingly, as discussed further below, processor 10 includes various execution units, registers, buffers, memories, and other functional units, which are all formed by integrated circuitry. As depicted in FIG. 2, processor 10 is coupled to system bus 120 via a bus interface unit BIU 12 within processor 10. BIU 12 controls the transfer of information between processor 10 and other devices coupled to system bus 120 such as a main memory 116. Processor 10, system bus 120, and the other devices coupled to system bus 120 together form a data processing system.

BIU 12 is connected to instruction cache 14 and data cache 16 within processor 10. High speech caches, such as instruction cache 14 and data cache 16, enable processor 10 to achieve relatively fast access time to a subset of instructions or data previously transferred from main memory to instruction cache 14 and data cache 16, thus improving the speed of operation of the data processing system.

Instruction cache 14 is further coupled to instruction fetch unit 17, which fetches instructions from instruction cache 14 during each cycle for execution by execution circuitry within processor 10. Branch unit (BU) is connected in parallel with execution circuitry and provides a check function for validity of instructions in the pipeline.

In the depicted embodiment, the execution circuitry of processor 10 comprises multiple execution units, including fixed-point unit (FXU) 22, load/store unit (LSU) 28, and floating-point unit (FPU) 30. As is well known by those skilled in the art, each of execution units FXU 22, LSU 28, and FPU 30 executes one or more instructions within a particular class of sequential instructions during each processor cycle. For example, FXU 22 performs fixed-point mathematical operations such as addition, subtraction, ANDing, ORing, and XORing utilizing source operands received from specified general purpose registers (GPRs) 32. Following the execution of a fixed point instruction, FXU 22 outputs the data results of the instruction to one or more of GPRs 32. Conversely, FPU 30 performs floating-point operations, such as floating-point multiplication and division, on source operands received from floating-point registers FPRs 36. FPU 30 outputs data resulting from the execution of floating-point instructions to selected FPRs 36. As its name implies, LSU 28 executes floating-point and fixed-point instructions which either load data from memory (i.e., either data cache 16 or main memory) into selected GPRs 32 or FPRs 36 or which store data from a selected GPRs 32 or FPRs 36 to memory.

Instructions are processed by each of FXU 22, LSU 28 and FPU 30 at a sequence of pipeline stages. As is typical of high performance processors, each instruction is processed at a number of pipeline stages, for example, fetch, decode/dispatch, execute, and write.

The present invention provides a novel processor system (and/or architecture) for providing instructions to a processor pipeline. This system is designed to deliver a steady stream of instructions to the execution circuitry of the processor through the instruction buffers. The architecture supports conditional branch prediction, branch address prediction and branch mis-prediction recovery. The architecture's control scheme provides that signals entering dynamic macros do so at the beginning of the cycle. In the preferred embodiment, an IFU is designed with specialized control logic and a plurality of multiplexor-latches (MUX-latches), which interacts with a specially designed I-cache to provide the instruction fetching, address resolution, branch processing and instruction queuing functions, without a branch unit, instruction queue or other hardware components utilized in traditional instruction fetch architectures.

The preferred embodiment includes control hardware circuitry components within the IFU and a new I-cache design. These circuit components include a plurality of MUX-latches and programmable logic arrays (PLAs). The MUXes are attached to edge-triggered flip-flops which copies to the associated output every cycle. Use of PLAs enables all inputs to be made available coming out of a latch at the beginning of a cycle.

More specifically, in the preferred embodiment, the I-cache is a 64 kilobyte cache having cache lines that are 32 instructions wide. Each cache line has an identifying effective (or virtual) address. Additionally, the I-cache also contains at least three internal buffers capable of holding a cache line of 32 instructions. Other components within the I-cache include a PRED formatter and an Array formatter which control which instructions are sent to the instruction buffers.

Branch processing is automatically completed within the I-cache. The special design of the I-cache permits both the target and in-line paths to be available for late selection. A target is always fetched when a branch is detected. Additionally, as a sum-addressed I-cache, the I-cache is able to simultaneously resolve and fetch a relative branch address and reduce the latency of the instruction fetch by at least one cycle. Other features of this new architecture are described further herein with reference to the FIG. 3.

Figure 3:
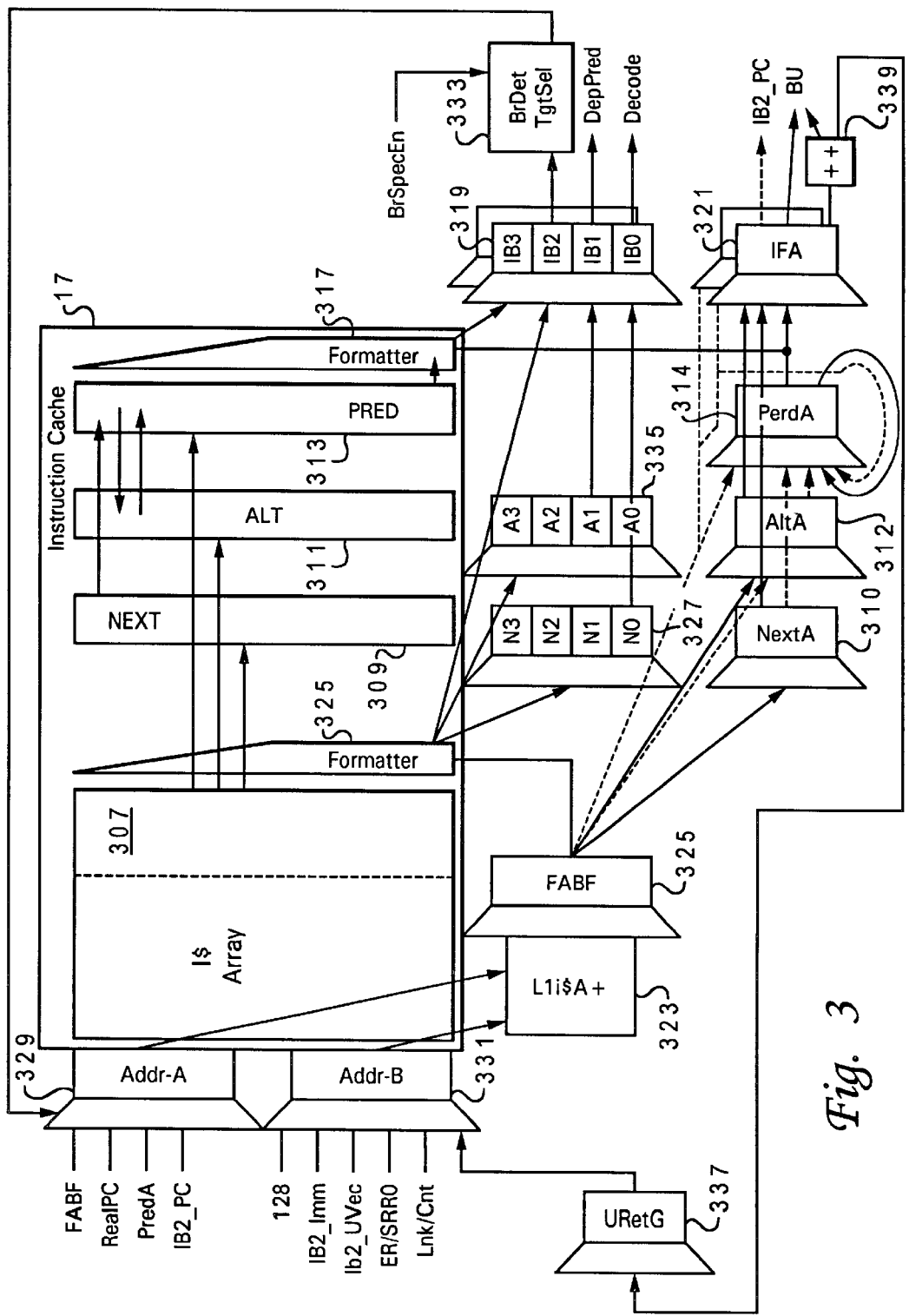
FIG. 3 is a block diagram of the component parts of an instruction fetching system depicting the flow of instructions and instruction addresses through the hardware and logic components of the processor in accordance with a preferred implementation of the present invention.

FIG. 3 as presented combines these various components as blocks within a block diagram, which illustrates the process of instruction fetching and branch resolution, etc. The logic blocks (MUX-latches and PLAS) located at the bottom of FIG. 3, are a part of the IFU 17 control logic.

IN-LINE INSTRUCTION FETCH

Instruction fetch requests are transmitted to the I-cache from the IFU 17. The basic function of IFU 17 is to fetch instructions from the I-cache 14 and provide the instruction paired with the address of the instruction to the execution circuitry. IFU 17 also provides an address valid bit (within the instruction fetch address register (IFA) register) which is set (1) when the instruction corresponds to the address and is cleared (0) when it does not.

Instruction cache 14 has two latch-controlled inputs, Addr-A 329 and Addr-B 331. The I-cache's decoder implicitly sums the operands of Addr-A 329 and Addr-B 331 to determine the address of the line to read out of the cache array 307. Thus, I-cache 14 is also referred to as a sum-address I-cache.

At the same time, adder 323 is utilized to resolve the read address in parallel with the I-cache access by summing the operands of Addr-A 329 and Addr-B 331. This read address is stored in the FABF register 325.

I-cache 14 also contains a NEXT buffer 309, an ALT buffer 311, and a PRED buffer 313. PRED buffer is a line buffer that contains a line full of instructions along the currently predicted path and is used to service in-line instruction sequencing. ALT buffer is a line buffer that contains a line full of instructions along the currently not predicted path (i.e., the alternate path) and is used to service branch prediction reversal and cases where in-line instruction sequencing does not keep up with the branch target processing. NEXT buffer is a line buffer that contains a line full of instructions along the currently predicted path, but is one line past the contents of the PRED buffer. NEXT buffer is used to hold the results of in-line pre-fetches and to satisfy in-line instruction sequencing when the PRED buffer is exhausted.

Finally, I-cache 14 contains two 32 input multiplexors, array formatter 315 and PRED formatter 317, which select a particular set of 4 instructions from a line of instructions.

Each of the three line buffers has a corresponding address tag register. Thus, NextA 310, AltA 312, and. PredA 314 each contain the line address for the instruction in the NEXT 309, ALT 311, and PRED 313 buffers, respectively. The address tag register also contains an instruction index field and an instruction valid bit. FIG. 4 illustrates the fields of the PredA register 314 from the most significant bit (msb) to the least (lsb).

PRED buffer 313 is used to produce in-line instruction sequences. The output of the PRED buffer is sent through PRED formatter 317 which selects up to four of the 32 instructions to be loaded into the instruction buffers (IB0 to IB3) 319, (hereinafter referred to as IB 319). PRED formatter 317 routes one of the 32 instructions into IB0 according to the 5 bit index (which represents a line position, 0–31) located in instruction index field of PredA register 314. The 5 bit field is provided as an input to the PRED formatter 317 and controls which instruction from the instruction line is sent to the instruction buffer 319. Thus, IB0 is loaded with the instruction at the position of the 5-bit index, IB1 is loaded with the instruction one position after the index, etc. If the index is within 3 instructions of the end of the line, one or more of IB1 through IB3 will be empty. The instruction buffer is advanced in-line by incrementing the 5-bit index field with a 5-bit incrementer each cycle. When data from the PRED buffer 313 is latched into the IB 319, the PredA output is latched into instruction fetch address register (IFAR) 321.

The NEXT buffer 309 holds in-line pre-fetches until the instructions are needed to continue filling the in-line path. IFU 17 supports two different in-line pre-fetches, one during run mode and another during restart.

A run mode in-line pre-fetch is initiated when instructions are being fetched from the last quarter of the line in the PRED buffer 313 and the instruction cache array 307 is idle. IFU's control logic initiates the fetch by: (1) asserting an array activation signal, 'use line 1' (USEL1), corresponding to the line of instructions in the array; (2) selecting the PredA input to Addr-A 329, to load the line index of the PRED buffer 313; and (3) selecting 128 (corresponding to the value required to skip to the address of the first instruction at the next line from the address of the currently executing line) as the input to Addr-B 331.

Thus, a read of the I-cache 14 is started at the address of the line sequentially after the line being executed. During the first cycle of the read, the array loads a line into an internal latch while an external adder (L1I$A+) 323 generates the read address which is latched into FABF register 325. In the second cycle of the read, the FABF instruction index (which will be zero, corresponding to the first instruction of the next line) is applied to the array formatter 315. The controller zeros out the 5 bit field in PREDA and adds 128 to select the first instruction on the next sequential line. I-cache 14 inputs to the NEXT buffer 309, next formatted buffer (N0–N3) 327, and NextA 310 are selected so that at the end of the second cycle, NEXT buffer 309 is filled with the line of instructions and ready to be forwarded to the instruction buffers 319 and PRED buffers 313.

When IFAR 321 is ready to-wrap around from the last instruction (instruction 31) of the line in the PRED buffer 313 into instruction 0 of the line in the NEXT buffer 309, IFU's control logic sets the selects on the Mux-latches of IB 319, IFA 321, PRED 313, and PredA 314 to receive data from the Mux-latches of NEXT 309, N0–N3 327, and NextA 310. Since the instruction in N0 will be decoded in the next cycle, the values of N0–N3 327 will be transferred into IB0–IB3 319 and NextA 310 into IFA 321. In the second cycle, because instruction 1 comes from the PRED formatter 317, the NEXT line is loaded into the PRED buffer 313 and NextA+1 is loaded into PredA 314. This increment is only a 5-bit increment on the instruction index field.

Thus, according to the present invention, the PRED 313 and NEXT buffers 309 allow IFU 17 to stream an in-line sequence of instructions through the IB 319 without interruption.

BRANCH INSTRUCTION FETCH

Branch instruction prediction and target fetching feature of the invention is now presented. In the preferred embodiment, the instructions are pre-decoded from 32 bits to 39 bits before they are loaded into I-cache 14. One of the seven additional bits is referred to as the IS_BRANCH bit. This bit allows a PLA-based controller to react to the presence of a branch in IB2 of IB 319. Branch processing begins with the instruction in IB2. If a branch is detected in IB2, the sequencer's control logic automatically initiates a target fetch by asserting USEL1, which enables a read from the I-cache array 307, and the branch target selection (TgtSel) 333. TgtSel 333 is a PLA that computes select signals for the multiplexors of Addr-A 329 and Addr-B 331. The target address is selected on Addr-A 329 and Addr-B 331 based upon a decode of the branch instruction in IB2. If IB2 holds a branch relative, IB2_PC is selected into Addr-A 329. Whenever none of the selects are asserted (i.e., an absolute branch, branch to register, or microcode entry), 0 is loaded into Addr-A 329. Addr-B 331 is then loaded with a sign extended immediate (IB2_Imm), a microcode entry point (IB2_UVec), or one of several register values. These register values correspond to the types of branch targets selected and include, for example, exception return (ER/SRR0), and link control (Lnk/Cnt).

If a cache miss occurs, the line buffer is marked as invalid and pre-fetch is initiated at the address stored in the FABF 325, allowing fetch exceptions to be processed at the correct place in the instruction stream.

In the first cycle of the fetch, the target line is read from the array 307 into an internal latch, and the fetch address is summed into the FABF latch 325. At the same time, assuming in-line operation is uninterupted, the branch instruction moves into IB1. During cycle two, the array formatter 315 prepares the target instruction group for direct bypassing into IB 319. Array formatter 315 is a MUX which is provided with a 5 bit address. The five bit address corresponds to one of the 32 instructions in the target line. During the second cycle, array formatter 315 sends four instructions as input to the instruction buffer 319. The MUX of IB 319 receives a control input which indicates wether to select the instructions received from the array formatter 315 (i.e., the target instructions) or the instructions from the PRED formatter 317 (i.e., the in-line instructions). Assuming instructions are streaming normally, the branch moves into location IB0 after the second cycle of the target fetch.

At this point, IFU's control logic performs one of the following series of steps:

(1) predict the branch in IB0 will be taken and
  a. select output of the array formatter 315 into IB 319 so that the target instruction can be decoded in the next cycle,
  b. IFA 321 latches FABF 325,
  c. PRED buffer 313 grabs the line read from the array 317,
  d. PredA 314 stores the value in FABF 325 with the instruction index incremented,
  e. ALT buffer 311 latches the line in the PRED buffer 313,
  f. A0–A2 335 stores IB1–IB3 319, and
  g. AltA 312 stores PredA 314 with the instruction index incremented; or (2) predict the branch in IB 319 will not be taken and
  a. select the output of the PRED formatter 317 into IB 319 so that in-line execution continues,
  b. IFA 321 latches PredA 314,
  c. increment the PredA instruction index,
  d. ALT buffer 311 retrieves the line read from the array 307,
  e. A0–A3 335 receives the output of the array formatter 315, and
  f. AltA 312 latches FABF 325; or (3) not detect a branch in IB0, because in-line streaming was interrupted. In this case:
  a. ALT buffer 311 selects the line read from the cache array 307,
  b. A0–A3 335 receives the output of array formatter 315,
  c. AltA 312 latches FABF 325,
  d. Later, when a branch is detected in IB0 that is predicted to go to the target and no target is in the second cycle of the read pipeline, the actions in case (a) above will take place with ALT 311, A0–A3 335, and AltA 312 replacing the cache array 307, array formatter 315 and FABF 325 as the source of the target line.

While the PRED buffer 313 holds the instructions on the predicted path, the ALT buffer 311 holds the instructions along the alternate branch path. Thus, ALT buffer 311 is used to facilitate incorrectly scheduled or predicted branch processing. If another unit in the system detects that a conditional branch direction was likely mis-predicted then IFU 17 can resume streaming from ALT buffer 311. ALT buffer 311, like NEXT buffer 309 does not have a formatter. It has instead registers A0–A3 335 to hold previously formatted instruction groups.

FETCH ON RE-START

As another feature of the invention, IFU 17 provides a restart mechanism. If the BU 18 detects that the IFU is providing an incorrect sequence of instructions it asserts a 'bad instruction' (IBAD) signal. IBAD signal causes IFU's control logic to kill instructions in the write-back stage, initiate a fetch/read from the I-cache array 307 by asserting USEL1, selecting fix address, RealPC, into Addr-A 329 and a value of 0 into Addr-B 331. RealPC is an input from BU 18, allowing BU 18 to control the start address of the new sequence. As restart proceeds, a second in-line fetch is initiated. IFU 17 initiates an in-line pre-fetch during a restart by selecting the previous cycle's line index from the FABF 325 into Addr-A 329 and a value of 128 into Addr-B 331. Then, as the instructions corresponding to the restart address appear at the output of the array formatter 315, the formatter output is latched into IB 319 and PRED 313, FABF 325 is loaded into IFAR 321, and FABF 325 with the instruction index field incremented is loaded into PredA 314. If a second in-line fetch is started, the NEXT buffer 309 will latch the output of cache array 307.

As another related feature, IFU 17 also facilitates microcode return address speculation through the microcode return address guess register (UretG) 337. When the instruction in IB0 is decoded to be branch to microcode, the IFU latches IFA+4 339 into UretG 337. Thus, in the next cycle, the return address will be available to a microcode-return instruction in IB2. This greatly improves the accuracy of the branch address speculation on the microcode return.

The I-cache design of the present invention provides the fetching mechanism of the processor with a number of advanced features, which include: (1) The address is presented to the cache in the form of two operands that when summed produce the required address; (2) The cache array delivers a full 32 instruction wide line to its output in two cycles; (3) Reads and writes are fully pipelined; (4) The cache array can load a full 32 instruction wide line in two cycles; (5) There are three full 32 instruction wide line buffers; and (6) The formatters deliver up to four instructions aligned to an instruction boundary to the instruction buffer.

While the invention has been particularly shown and described with reference to a preferred embodiment, it will be understood by those skilled in the art that various changes in form and detail may be made therein without departing from the spirit and scope of the invention. For example, although the invention has been described with specific reference to a high-frequency processor, the invention is capable of being implemented in any processor.

What is claimed is:

1. A system for delivering instructions to a processor comprising:
  an instruction fetching unit (IFU);
  a sum-addressed instruction cache (I-cache) coupled to said IFU, said I-cache having a cache array and a plurality of line buffers with capacity for holding, a line of multiple instructions, including a PRED buffer utilized to produce in-line instructions to an instruction buffer, a NEXT buffer utilized to allow a state machine to find idle cache bandwidth to pre-fetch a next cache line prior to a completion of the line of instructions in the PRED buffer, and an ALT buffer utilized for fetching targets of branch instructions;

means for fetching said instructions from said I-cache to provide both target and in-line path; and means for late selecting between target and in-line path instructions.

2. The system of claim 1, wherein said capacity of said plurality of line buffers is a line of 32 instructions, said I-cache further comprises:

means for delivering a full line of said cache array to one of said buffers in two cycles; and means for providing up to four instructions aligned to an instruction boundary to an instruction buffer.

3. The system of claim 1, wherein:

said IFU further contains means for sending an instruction fetch address (IFA) to said I-cache as two operands; and said I-cache further comprises:

means for receiving said two operands;

means for summing said two operands together to produce said IFA; and means for issuing a line of instructions corresponding to said IFA to one of said plurality of line buffers within said I-cache.

4. The system of claim 1, wherein said I-cache has a PRED formatter, and wherein further said I-cache comprises means for receiving instructions from said PRED buffer into said PRED formatter.

5. The system of claim 4, wherein said receiving means further includes means for selecting said up to four instructions from a 32 instruction line of said PRED buffer.

6. The system of claim 5, wherein said selecting means includes:

a 5-bit index located in a 64-bit PREDA register, said register holding the address of the line of instructions present in the PRED buffer, and said 5-bit index providing the specific location within said line at which an instruction to be loaded into said instruction buffer is located; and means for updating a value of said 5-bit index to provide a continuous stream of instructions to said instruction buffers.

7. The system of claim 1, wherein said ALT buffer and said PRED buffer are utilized by said IFU to accelerate branch processing, said system further comprising:

means for scanning ahead a number of cycles to determine if a branch is present in said instruction buffer;

means, responsive to said scanning means, for automatically fetching a line of instructions containing said target when said branch is present; and means for storing said target line, wherein said target line is stored in the PRED buffer if the branch is predicted taken and in the ALT buffer if said branch is predicted not taken or the target arrives before it is needed.

8. The system of claim 7, further comprising:

means for issuing a selected target instruction directly to said instruction buffers from said cache array;

means for controlling whether an instruction loaded into said instruction buffer is loaded from said selected target or said in-line instructions, wherein said instruction is load from said selected target instruction when a branch instruction is predicted taken.

9. The system of claim 7, further comprising means for swapping a content of the PRED buffer with that of the ALT buffer when a branch direction is reversed.

10. The system of claim 1, further comprising:

means for monitoring when a line of instructions in sad PRED buffer is near completion;

means responsive to said monitoring means for initiating a fetch of a next sequential line of instructions into said NEXT buffer; and means for transferring said next sequential line of instructions into said PRED buffer when said line of instructions in said PRED buffer is completed.

11. The system of claim 1, further comprising means for saving a next in-line address in a register to enable efficient, lower latency restarts after a pipeline break.

12. The system of claim 1, further comprising means for saving a next in-line address in a register when an instruction is emulated, thus providing higher accuracy and lower latency restart after emulation.

13. A data processing system for delivering instructions to a processor comprising:

an instruction fetching unit (IFU);

a sum-addressed instruction cache (I-cache) coupled to said IFU, said I-cache having a cache array and a plurality of line buffers with capacity for holding a line of multiple instructions, including a PRED buffer utilized to produce in-line instructions to an instruction buffer, a NEXT buffer utilized to allow a state machine to find idle cache bandwidth to pre-fetch a next cache line prior to a completion of the line of instructions in the PRED buffer, and an ALT buffer utilized for fetching targets of branch instructions;

means for fetching said instructions from said I-cache to provide both target and in-line path;

means for late selecting between target and in-line path instructions;

means for delivering a full line of said cache array to one of said buffers in two cycles; and means for providing up to four instructions aligned to an instruction boundary to an instruction buffer.

14. The data processing system of claim 13, wherein:

said IFU further contains means for sending an instruction fetch address (IFA) to said I-cache as two operands; and said I-cache further comprises:

means for receiving said two operands;

means for summing said two operands together to produce said IFA; and means for issuing a line of instructions corresponding to said IFA to one of said plurality of line buffers within said I-cache.

15. The data processing system of claim 13, wherein said I-cache has a PRED formatter, and wherein further said I-cache comprises means for receiving instructions from said PRED buffer into said PRED formatter.

16. The data processing system of claim 15, wherein said receiving means further includes means for selecting said up to four instructions from a 32 instruction line of said PRED buffer.

17. The data processing system of claim 16, wherein said selecting means includes:

a 5-bit index located in a 64-bit PREDA register, said register holding the address of the line of instructions present in the PRED buffer, and said 5-bit index providing the specific location within said line at which an instruction to be loaded into said instruction buffer is located; and means for updating a value of said 5-bit index to provide a continuous stream of instructions to said instruction buffers.

18. The data processing system of claim 13, wherein said ALT buffer and said PRED buffer are utilized by said IFU to accelerate branch processing, said system further comprising:
   means for scanning ahead a number of cycles to determine if a branch is present in said instruction buffer;
   means, responsive to said scanning means, for automatically fetching a line of instructions containing said target when said branch is present; and
   means for storing said target line, wherein said target line is stored in the PRED buffer if the branch is predicted taken and in the ALT buffer if said branch is predicted not taken or the target arrives before it is needed.

19. The data processing system of claim 18, further comprising:
   means for issuing a selected target instruction directly to said instruction buffers from said cache array;
   means for controlling whether an instruction loaded into said instruction buffer is loaded from said selected target or said in-line instructions, wherein said instruction is load from said selected target instruction when a branch instruction is predicted taken.

20. The data processing system of claim 18, further comprising means for swapping a content of the PRED buffer with that of the ALT buffer when a branch direction is reversed.

21. The data processing system of claim 13, further comprising:
   means for monitoring when a line of instructions in said PRED buffer is near completion;
   means responsive to said monitoring means for initiating a fetch of a next sequential line of instructions into said NEXT buffer; and
   means for transferring said next sequential line of instructions into said PRED buffer when said line of instructions in said PRED buffer is completed.

22. The data processing system of claim 13, further comprising means for saving a next in-line address in a register to enable efficient, lower latency restarts after a pipeline break.

23. The data processing system of claim 13, further comprising means for saving a next in-line address in a register when an instruction is emulated, thus providing higher accuracy and lower latency restart after emulation.

24. An instruction fetching mechanism of a processor comprising:
   an instruction fetching unit (IFU);
   an instruction cache (I-cache) coupled to said IFU, wherein said I-cache includes:
      sum address buffers which provide said I-cache with a line address based on two address operands received from said IFU;
      a 64 byte cache array, having a plurality of instruction lines with a capacity for 32 instructions per line;
   an array formatter for providing a target instruction directly from said cache array to an instruction buffer during branch processing;
   a PRED buffer, which holds a line of instructions presently being completed;
   a PRED formatter for providing up to four in-line instructions to said instruction buffer;
   an ALT buffer, which holds the target line of instructions, wherein said target line of instructions is fetched prior to a resolution of a corresponding branch instruction in the instruction buffer; and
   a NEXT buffer, which holds the next line of instructions required until a present line of instructions in the PRED buffer is completed.

25. The instruction fetching mechanism of claim 24, wherein said IFU includes:
   control logic for determining which line of instructions is loaded into one of said line buffers;
   address registers for tracking said line of instruction presently loaded into each respective line buffer, wherein said address registers include an index for identifying which instruction is currently being completed; and
   a last correct instruction register for enabling a restart after a stoppage in the processing of instructions.

* * * * *

UNITED STATES PATENT AND TRADEMARK OFFICE
CERTIFICATE OF CORRECTION

PATENT NO. : 6,604,191 B1
DATED : August 5, 2003
INVENTOR(S) : Flachs et al.

It is certified that error appears in the above-identified patent and that said Letters Patent is hereby corrected as shown below:

<u>Title page,</u>
Please correct the inventor's name from "Flacks" to -- Flachs -- at all appropriate places.

<u>Column 10,</u>
Line 1, please delete the word "sad" and replace with the word -- said --.

Signed and Sealed this

Fifth Day of April, 2005

JON W. DUDAS
*Director of the United States Patent and Trademark Office*